US011958182B2

(12) United States Patent
Kawashima et al.

(10) Patent No.: US 11,958,182 B2
(45) Date of Patent: Apr. 16, 2024

(54) MOBILE UNIT SYSTEM

(71) Applicant: TOYOTA JIDOSHA KABUSHIKI KAISHA, Toyota (JP)

(72) Inventors: Mutsumi Kawashima, Nisshin (JP); Tomoaki Miyazawa, Nagoya (JP); Masato Noritake, Toyoake (JP); Nobuhiro Nishikawa, Tokyo (JP); Masato Kurima, Tokyo (JP); Tokuyuki Nishikawa, Toyota (JP); Reiko Tomita, Nagakute (JP); Takaaki Kato, Ichinomiya (JP); Hiroyuki Tomita, Kariya (JP); Daisaku Kato, Iwakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 300 days.

(21) Appl. No.: 17/550,710

(22) Filed: Dec. 14, 2021

(65) Prior Publication Data
US 2022/0193916 A1 Jun. 23, 2022

(30) Foreign Application Priority Data

Dec. 17, 2020 (JP) ................ 2020-209127

(51) Int. Cl.
 B25J 11/00 (2006.01)
 G06F 3/14 (2006.01)
 G06T 11/00 (2006.01)
(52) U.S. Cl.
 CPC ............... *B25J 11/008* (2013.01); *G06F 3/14* (2013.01); *G06T 11/00* (2013.01)

(58) Field of Classification Search
 CPC . G05B 2219/45084; G05B 2219/36488; B25J 11/008; B25J 11/001; G06F 2203/011
 See application file for complete search history.

(56) References Cited

U.S. PATENT DOCUMENTS 11,042,028 B1\* 6/2021 Welch ................. G06T 15/08
2003/0045203 A1 3/2003 Sabe et al.
2015/0314454 A1\* 11/2015 Breazeal ............... G10L 15/32
                                                                  700/259

(Continued)

FOREIGN PATENT DOCUMENTS

CN    1338980 A    3/2002
JP    2002-166378 A    6/2002
JP    2003-339796 A    12/2003

(Continued)

*Primary Examiner* — Khoi H Tran
*Assistant Examiner* — Christopher A Buksa
(74) *Attorney, Agent, or Firm* — Dinsmore & Shohl LLP

(57) ABSTRACT

A mobile body system for managing a mobile body that moves within a predetermined area includes a mobile body associated with a guest group including one or more guests, and a managing apparatus configured to manage an outer appearance of the mobile body. The managing apparatus includes an activity collector configured to collect activity information indicative of an activity of the guest within the predetermined area, and an outer appearance manager configured to change the outer appearance of the mobile body viewed by the guest based on the activity information collected by the activity collector.

7 Claims, 8 Drawing Sheets

(56) References Cited

U.S. PATENT DOCUMENTS

2017/0368678 A1    12/2017    Otsuka

FOREIGN PATENT DOCUMENTS

| JP | 2006-123854 A | 5/2006 |
| JP | 2014-144514 A | 8/2014 |
| JP | 2017-226044 A | 12/2017 |
| JP | 2019-217122 A | 12/2019 |
| WO | 2018/135502 A1 | 7/2018 |

* cited by examiner

| GUEST ID | SUPPORT EVALUATION POINT Ss | MORALITY EVALUATION POINT Sm | CONSUMPTION EVALUATION POINT Sc | OUTER APPEARANCE LEVEL La | MOBILE BODY ID |
|---|---|---|---|---|---|
| U0001 | 22 | 20 | 13 | 1 | Null |
| U0002 | 13 | 28 | 34 | 1 | M0123 |
| U0003 | 85 | 45 | 75 | 3 | M0022 |
| . | . | . | . | . | . |
| . | . | . | . | . | . |
| . | . | . | . | . | . |

MOBILE UNIT SYSTEM

CROSS REFERENCE TO RELATED APPLICATION

This application claims priority to Japanese Patent Application No. 2020-209127 filed on Dec. 17, 2020, which is incorporated herein by reference in its entirety including the specification, claims, drawings, and abstract.

TECHNICAL FIELD

The present specification discloses a mobile unit (body) system for managing a mobile body that moves within a predetermined area.

BACKGROUND

In recent years, use of mobile bodies such as robots that perform certain tasks in place of humans has been proposed in various facilities. Patent Document 1, for example, discloses a cargo transporting robot that autonomously moves while holding an item of cargo by following a transmitter held by a user. Use of such a mobile body in a predetermined area having a special atmosphere, such as an amusement park and a theme park, has also been proposed.

CITATION LIST

Patent Literature

Patent Document 1: JP 2006-123854 A

Under current situations, however, mobile bodies function only as a tool that performs certain tasks in place of humans. In this case, although the mobile bodies are convenient for visitors to predetermine areas (hereinafter referred to as "guests"), the guests do not feel a special attachment to the mobile bodies. Conventional mobile bodies have therefore failed to motivate the guests to visit the predetermined areas.

Embodiments of the disclosure are therefore aimed at providing a mobile body system including a mobile body to which a guest is likely to have an attachment, and which could motivate the guest to visit a predetermined area.

SUMMARY

In accordance with an aspect of the disclosure, a mobile body system for managing a mobile body that moves within a predetermined area includes a mobile body associated with a guest group including one or more guests, and a managing apparatus configured to manage an outer appearance of the mobile body. The managing apparatus includes an activity collector configured to collect activity information indicative of an activity of the guest within the predetermined area, and an outer appearance manager configured to change the outer appearance of the mobile body viewed by the guest based on the activity information collected by the activity collector.

Changing the outer appearance of the mobile body viewed by the guest in accordance with activities of the guest makes the guest feel as if they are "rearing" the mobile body. This increases an attachment of the guest to the mobile body and therefore increases their interest in the predetermined area.

In the above configuration, the outer appearance manager may evaluate the guest based on an amount of support activity performed by the guest for the mobile body, and may change the outer appearance of the mobile body to an outer appearance having a greater amount of growth or an outer appearance with higher rarity the more highly evaluated the guest is.

This configuration induces the guest to positively support the mobile body, resulting in smoother management of the mobile body system.

In the above mobile body system, the outer appearance manager may evaluate the activity of the guest in terms of morality based on the activity information, and may change the outer appearance of the mobile body to an outer appearance having a greater amount of growth or an outer appearance with higher rarity the more highly evaluated the guest is.

This configuration encourages each guest to positively perform morally desirable activities, allowing the guest to spend a comfortable time within the predetermined area.

In the above mobile body system, the outer appearance manager may evaluate the activity of the guest according to an amount of consumption activity based on the activity information, and may change the outer appearance of the mobile body to an outer appearance having a greater amount of growth or an outer appearance with higher rarity the more highly evaluated. the guest is.

This configuration encourages the guest to positively perform consumption activities, thus increasing profitability of the predetermined area.

In the above mobile body system, the outer appearance of the mobile body may be changeable by expanding or contracting, swelling or shrinking, or storing or developing at least some components of the mobile body.

This configuration enables the guest to see a change in the outer appearance of the mobile body without using augmented reality glasses (hereinafter referred to as "AR glasses"), for example, thus eliminating the inconvenience of the guest wearing AR glasses and allowing the guest to spend more comfortable time in the predetermined area.

The above mobile body system may further include an augmented reality display configured to display a virtual object image superposed on a real image. The augmented reality display may store, as the object image, a plurality of images showing the outer appearance of the mobile body. The outer appearance manager may change the object image to be superposed on the real image based on the activity information collected by the activity collector to thereby change the outer appearance of the mobile body viewed by the guest.

This configuration changes the object image to be superposed to thereby change the outer appearance of the mobile body viewed by the guest, thus increasing a degree of freedom of the change in the outer appearance of the mobile body.

In the above mobile body system, the activity collector may collect, as the activity information, at least one of image data obtained by imaging the guest, recorded data obtained by recording speech of the guest, settlement data indicating a settlement history of the guest, or support data indicating a reaction of the guest to a support request from the mobile body.

In the above mobile body system, the mobile body may increase or decrease a function to be provided for the guest in accordance with a change in the outer appearance.

Increasing or decreasing the number of functions to be provided in accordance with the change of the outer appearance gives the guest an impression that not only the outer appearance of the mobile body but also the content of the mobile body is growing. This allows the guest to further strongly feel the mobile body as a "living creature" and increase the attachment of the guest to the mobile body.

The mobile body system disclosed in the present specification increases the attachment of the guest to the mobile body, and the mobile body therefore motivates the guest to visit the predetermined area.

BRIEF DESCRIPTION OF DRAWINGS

Embodiments of the present disclosure will be described based on the following figures, wherein.

DESCRIPTION OF EMBODIMENTS

Figure 1:
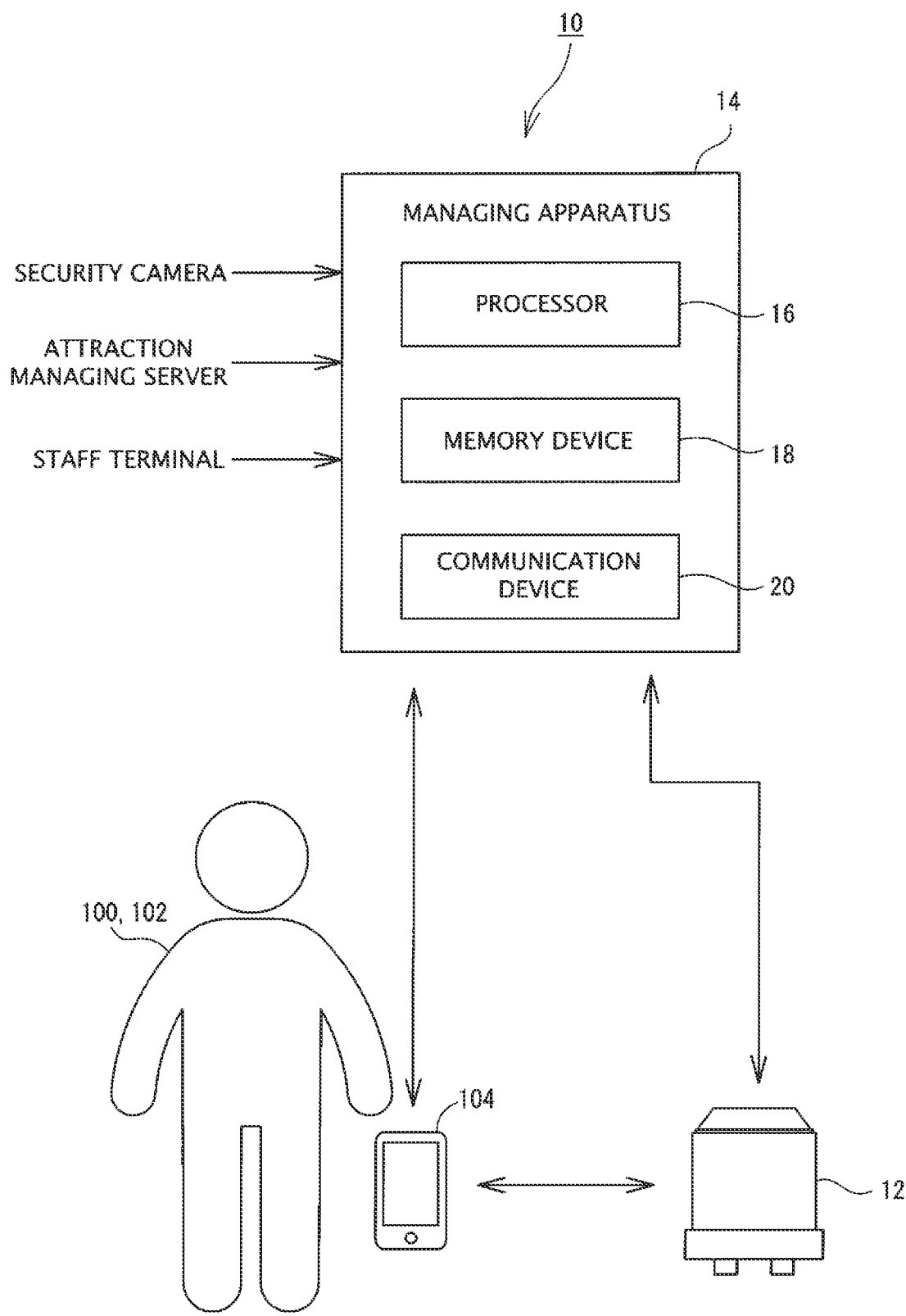
FIG. 1 is an image view illustrating a configuration of a mobile body system.

A configuration of a mobile body system 10 will be described below by reference to the drawings. FIG. 1 illustrates a configuration of the mobile body system 10. The mobile body system 10 is configured to support activities of visitors (hereinafter referred to as "guests 100") to a specific park that is a predetermined area having a special atmosphere (e.g., amusement parks or theme parks) and to entertain the guests 100. The mobile body system 10 includes a mobile body 12 and a managing apparatus 14 that manages the mobile body 12.

The mobile body 12 is lent to a guest group 102 including one or more guests 100. The guest group 102 is an assembly of guests 100 that partake in activities together. Family members or friends visiting a park together form one guest group 102. A single guest 100 visiting a park alone also forms one guest group 102. In the example illustrated in FIG. 1, a single guest 100 forms one guest group 102.

The mobile body 12 moves autonomously in coordination with the guest 100 borrowing the mobile body 12 to support activities of the guest 100. Here, "coordination" refers to acquiring information or instructions through communication with a coordinated subject and determining at least some activities of the guest in accordance with the acquired information or instructions. In this example, the mobile body 12 communicates with a mobile terminal 104 of the guest 100 to acquire information or instructions, and, in accordance with the acquired information or instructions, determines their activities. To support the activities of the guest 100, the mobile body 12 also performs route guidance, baggage transportation, transportation of the guest 100, and electronic settlement, for example, in response to a request from the guest 100.

As will be described in detail below, the mobile body 12 in this example changes its outer appearance viewed by the guest 100 in accordance with the activities of the guest 100. Here, the "changing the outer appearance" refers to a change that suggests "growth" in living creatures, and includes a change in the shape of the mobile body 12. As described below, the change in the outer appearance may be achieved by extending or contracting, swelling or shrinking, or storing or developing part of the mobile body 12, for example. This change in the outer appearance starts from an initial outer appearance and proceeds to a final outer appearance having a greater amount of growth or higher rarity than the initial outer appearance.

In association with such a change in the outer appearance, the number of functions to be provided by the mobile body 12 for the guest 100 may be increased or decreased. For example, the mobile body 12 may be configured not to transport baggage when the mobile body 12 has the initial outer appearance, but to transport baggage when the outer appearance is "growing" and comes close the final outer appearance.

These changes in the outer appearance of the mobile body 12 function as a type of show to entertain the guest 100. Further, the changes in the outer appearance of the mobile body 12 and in the functions in accordance with the activities of the guest 100 make the guest 100 feel that they are "rearing" the mobile body 12. The guest 100 increases their attachment to the mobile body 12 by rearing the mobile body 12, and is thus motivated by the mobile body 12 to visit the park. As such, the mobile body 12 in this example not only functions as a simple tool but also entertains the guest 100, thus functioning as representation that increases an interest in the park.

The managing apparatus 14 manages the changes in the outer appearance of the mobile body 12. Specifically, the managing apparatus 14 manages to which guest group 102 each mobile body 12 is lent. The managing apparatus 14 further collects activity information indicating activities of the guest 100 within the park, as will be described in detail below. To collect the activity information of the guest 100, the managing apparatus 14 communicates with various devices including a mobile terminal 104 of the guest 100, the mobile body 12, security cameras disposed within the park, a managing server for attractions, and terminals of park staff members, for example. The managing apparatus 14 analyzes various data transmitted from these devices to recognize the activities of the guest 100.

The managing apparatus 14 determines the outer appearance of each mobile body 12 based on the collected activity information. Specifically, in response to a greater number of activities that are desirable to a park operator performed by the guest 100, the managing apparatus 14 makes the shape of the mobile body 12 closer to the final outer appearance. The managing apparatus 14 may also change the outer appearance of the mobile body 12 close to the initial outer appearance in response to the activity of the guest 100 that is not desirable to the operator. For example, if the guest 100 performs consumption activities more positively within the park, the managing apparatus 14 may change the outer appearance of the mobile body 12 closer to the final outer appearance. Meanwhile, if the guest 100 frequently performs activities that are not morally right, the managing apparatus 14 may change the outer appearance of the mobile body 12 close to the initial form. In any case, the managing apparatus 14 determines the outer appearance of the mobile body 12 in response to the activities of the guest 100, and outputs a change instruction to the mobile body 12 to change its outer appearance to the determined outer appearance. The mobile body 12 then changes its outer appearance in accordance with the change instruction. Such a change in the outer appearance of the mobile body 12 in response to the activities of the guest 100 may induce the guest 100 to positively perform activities that are desirable to the operator while avoiding undesirable activities.

Figure 2:
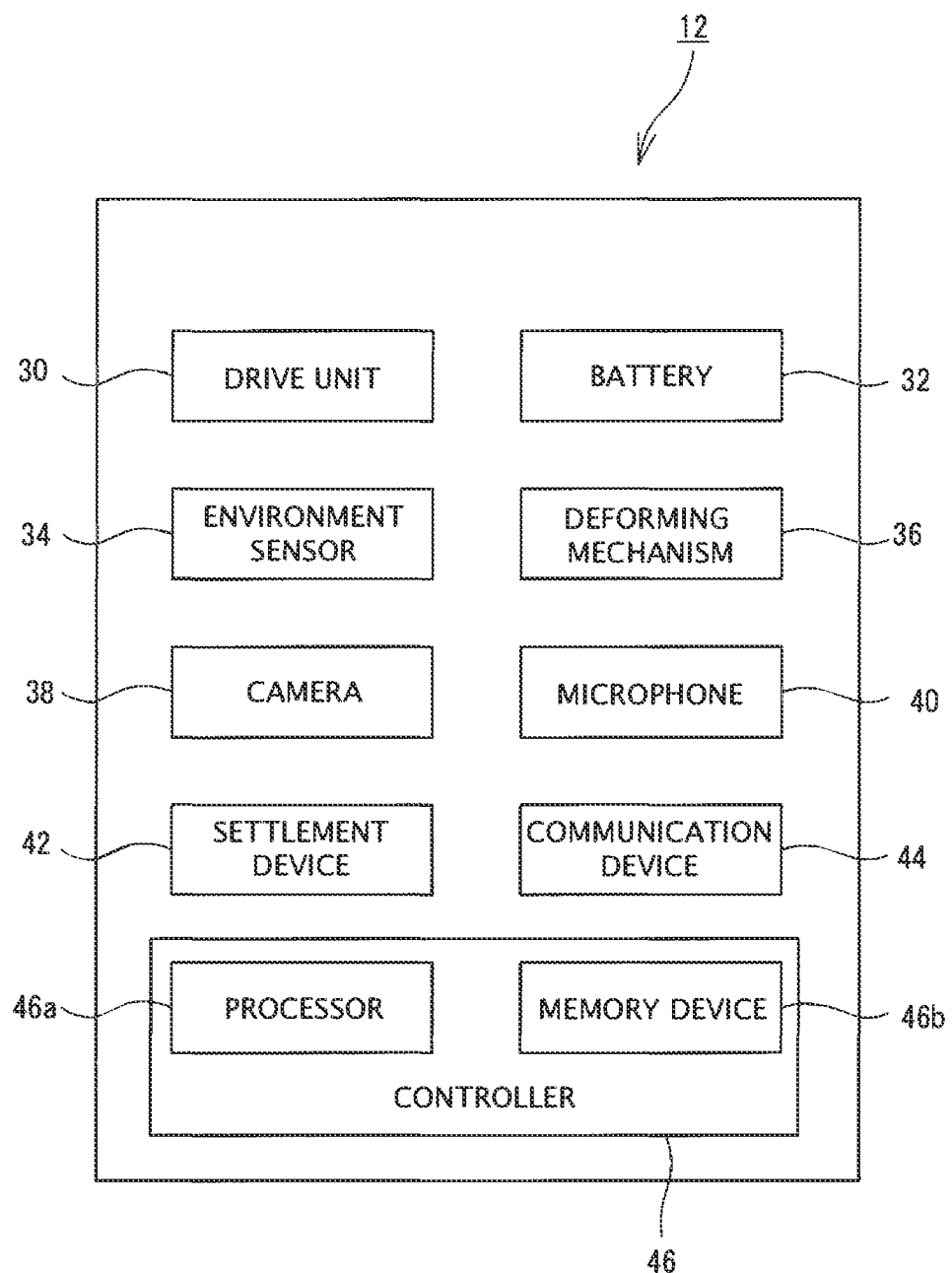
FIG. 2 is a block diagram illustrating a configuration of a managing apparatus.

Specific configurations of the mobile body 12 and the managing apparatus 14 will now be described. FIG. 2 is a block diagram illustrating the configuration of the mobile body 12. The mobile body 12 is autonomously movable. To achieve this movement, the mobile body 12 includes a drive unit 30. The drive unit 30 is configured to move the mobile body 12 and includes a traveling element such as a wheel or caterpillar track, and a motor that powers the traveling element. The mobile body 12 further includes an environmental sensor 34 that senses an ambient state of the mobile body 12, including, for example, a sensor that detects positions (e.g., a GPS sensor), a sensor that detects ambient objects (e.g., Lidar, a millimeter-wave radar, a sonar, or a magnetic sensor), and a camera that images the ambient objects. The mobile body 12 further includes a controller 46, which will be described below, which controls driving for the drive unit 30 based on information detected by these environmental sensors 34.

The mobile body 12 further includes a battery 32 that stores electric power to be supplied to electric components disposed in the mobile body 12, such as a motor, and the controller 46. The battery 32 is a chargeable/dischargeable secondary battery, such as a lithium ion battery. The battery 32 may be nondetachable from the mobile body 12 or may be removed from the mobile body 12, as required.

The mobile body 12 further includes a deforming mechanism 36 that changes the outer appearance of the mobile body 12. The deforming mechanism 36 includes, for example, an actuator, such as a motor, an electromagnetic cylinder, or a pneumatic cylinder, that expands or contracts, swells or shrinks, and stores or develops a deformable element in the mobile body 12, and a transmission mechanism that transmits the power of the actuator to the deformable element. Driving for the deforming mechanism 36 is also controlled by the controller 46.

The mobile body 12 further includes a communication device 44 that wirelessly communicates with information devices external to the mobile body 12. In particular, the communication device 44 in this embodiment is communicable with the managing apparatus 14 and the mobile terminal 104 of the guest 100. The communication device 44 may correspond to a plurality of communication standards to enable communication with the managing apparatus 14 and the mobile terminal 104. For example, the communication device 44 may use WiFi (registered mark) or mobile data communication for internet communication. The communication device 44 may further correspond to a short-range wireless communication standard such as Bluetooth (registered mark).

The mobile body 12 further includes a settlement device 42. The settlement device 42 performs a settlement process of the guest 100. The settlement may be of any type and may include at least one of cash settlement, prepaid card settlement, automatic deduction settlement, credit card settlement, or barcode settlement. To respond to these types of settlement, the settlement device 42 may include a cash device that counts the amount of input cash and gives change as required, a card reader, an RFID reader, and a barcode reader, for example. The guest 100 may use this settlement function to buy not only various articles such as souvenirs and meals but also tickets for attractions or amusement rides within the park. The settlement history using the settlement device 42 is sent, as settlement data, to the managing apparatus 14, and the managing apparatus 14 analyzes the settlement data to recognize the consumption activity of the guest 100.

The mobile body 12 further includes a camera 38 and a microphone 40 to record the activities of the guest 100 and a companion of the guest 100. Specifically, the camera 38 captures images of the guest 100, and the microphone 40 records speech of the guest 100. The captured image data and the recorded data are transmitted from the mobile body 12 to the managing apparatus 14, and the managing apparatus 14 analyzes the captured image data and the recorded data to recognize the activities of the guest 100. The number of the camera 38 and the microphone 40 may be one or more.

The controller 46 controls driving of each of sections of the mobile body 12. The controller 46 further transmits information indicating activities of the guest 100, that is, activity information, to the managing apparatus 14, as required. The activity information includes the captured image data in the camera 38, the recorded data in the microphone 40, and the settlement data indicating the settlement history.

The mobile body 12 outputs a support request when the mobile body 12 needs support by the guest 100. The support request requests the guest 100 to perform supporting actions including, for example, a replacing action for the battery 32, a cleaning action for at least part of the mobile body 12, and a restoring action for restoring the mobile body 12, that has lost a wheel or has rolled over, to a travelable state. Such a support request may be output through the mobile terminal 104 or may be output through a display or speaker (both not shown) disposed on the mobile body 12. In any case, the controller 46 confirms whether or not the guest 100 performs a requested supporting action within a predetermined time period after the output of this support request, and stores the confirmation result, as support data, in a memory device 46b. As such, the support data may be considered as data indicating the content of supporting actions performed by the guest 100. The controller 46 further transmits the support data, as one item of activity information, to the managing apparatus 14.

The controller 46 is a computer including a processor 46a and the memory device 46b. The "computer" includes a microcontroller, which is a computer system assembled in a single integrated circuit. The processor 46a refers to a processor in a broad sense, and includes a general-purpose processor such as Central Processing Unit (CPU) and a dedicated processor such as Graphics Processing Unit (GPU), Application Specific Integrated Circuit (ASIC), Field Programmable Gate Array (FPGA), and a programmable logic device. The actions of the processor 46a which will be described below may be performed not only by a single processor but also by a coordination of a plurality of processors disposed at physically distant locations. Similarly, the memory device 46b need not be physically one element, and may be composed of a plurality of memories dispose at physically distant locations. The memory device 46b may include at least one of a semiconductor memory such as RAM, ROM, and a solid state drive or a magnetic disk such as a hard disk drive.

Figure 3:
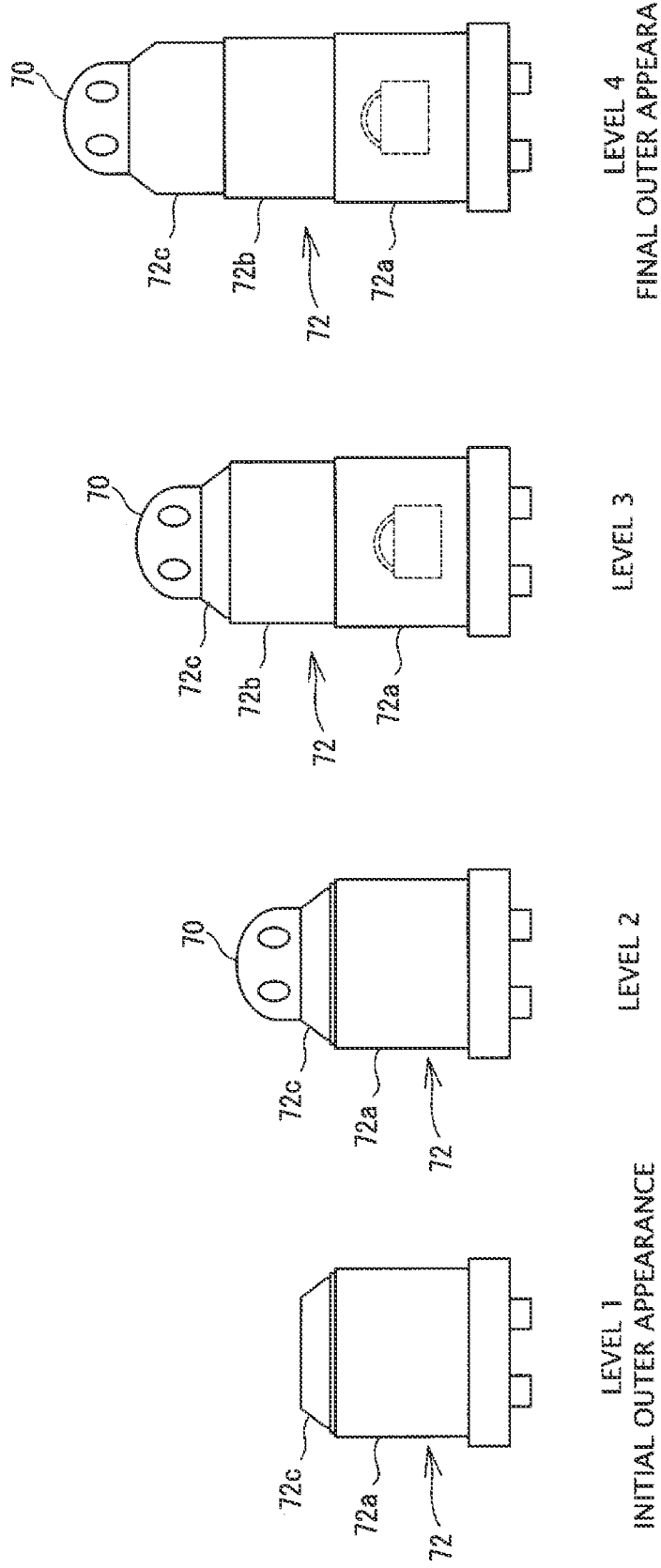
FIG. 3 illustrates example changes of the outer appearance of a mobile body.

Changes in the outer appearance of the mobile body 12 will be described with reference to FIG. 3. FIG. 3 illustrates one example change in the outer appearance of the mobile body 12. As has been repeatedly described, the mobile body 12 can change its outer appearance. The change of the outer appearance suggests "growth" and "transformation" of a living creature, and includes a change of a body shape, for example. Such a change in the outer appearance can be achieved by expanding or contracting, swelling or shrinking, or storing or developing part of the mobile body 12.

In the example illustrated in FIG. 3, the mobile body 12 includes an extendable torso 72 and a head 70 that can be developed or stored. The torso 72 includes a first torso 72a, a second torso 72b, and a third torso 72c that are telescoped to enable a mutual slidable movement for extending and contracting the torso 72. The head 70 is changeable from a state where the head 70 is stored within the third torso 72c to a state where the head 70 is developed external to the third torso 72c. In the example illustrated in FIG. 3, the initial outer appearance corresponds to a state where the torso 72 is completely contracted and the head 70 is stored within the third torso 72c, and the final outer appearance corresponds to a state where the torso 72 completely extends and the head 70 develops above the third torso 72c. In the following description, the outer appearance of the initial outer appearance has a level La=1, the outer appearance of the final outer appearance has a level La=4, and the outer appearances between these states have levels La=2 and La=3, respectively.

The mobile body 12 may have an increased or decreased number of functions that can be provided for the guest 100 in accordance with the change in the outer appearance. For example, the mobile body 12 may increase the number of functions that can be provided for the guest 100 as the outer appearance nears the final outer appearance. This configuration can make the guest 100 feel that not only the outer appearance but also the content of the mobile body 12 is "growing". This further makes the guest 100 feel that the mobile body 12 is like a "living creature" rather than a simple tool, increasing the attachment of the guest 100 to the mobile body 12.

In the example illustrated in FIG. 3, the mobile body 12 can provide the function of transporting baggage of the guest 100 as the outer appearance of the mobile body 12 is nearing the final outer appearance. Specifically, in the example of FIG. 3, when the mobile body 12 has the initial outer appearance with the second torso 72b being stored within the first torso 72a, the first torso 72a cannot house the baggage of the guest 100. When the outer appearance of the mobile body 12 has a level La 3 or higher with most of the second torso 72b being moved out of the first torso 72a, a space for housing the baggage can be formed within the first torso 72a. The mobile body 12 in this state provides the function of transporting the baggage of the guest 100. Note that the configuration illustrated in FIG. 3 is only one example, and additional functions that can be performed by the mobile body 12 as the mobile body 12 is nearing the final outer appearance may include functions other than the function of transporting baggage, such as a function of transporting the guest 100, a function of having a conversation with the guest 100, and a function of buying goods in place of the guest 100.

The mobile body 12 may further change a behavior shown for the guest 100 in accordance with its change of the outer appearance. For example, the mobile body 12 may increase the number of actions to express affection for the guest 100 as the outer appearance is nearing the final outer appearance. The actions to express affection include turning around the guest 100 and outputting a specific voice in response to speech of the guest 100, for example. This configuration further increases the attachment of the guest 100 to the mobile body 12.

The configuration of the managing apparatus 14 will now be described. As described above, the managing apparatus 14 manages the changes in the outer appearance of the mobile body 12, and is physically a computer including the processor 16, the memory device 18, and the communication device 20, as illustrated in FIG. 1.

The processor 16 refers to a processor in a broad sense and includes a general-purpose processor and a dedicated processor. The operations of the processor 16, which will be described below, are performed not only by a single processor, but may also be performed by coordination of a plurality of processors disposed at physically distant locations. Similarly, the memory device 18 need not be a single element and may include a plurality of memories disposed at physically distant locations. The memory device 18 may include at least one of a semiconductor memory or a magnetic disk. The communication device 20 communicates with devices external to the managing apparatus 14, and is, for example, capable of internet communication using WiFi (registered mark) or mobile data communication.

Figure 4:
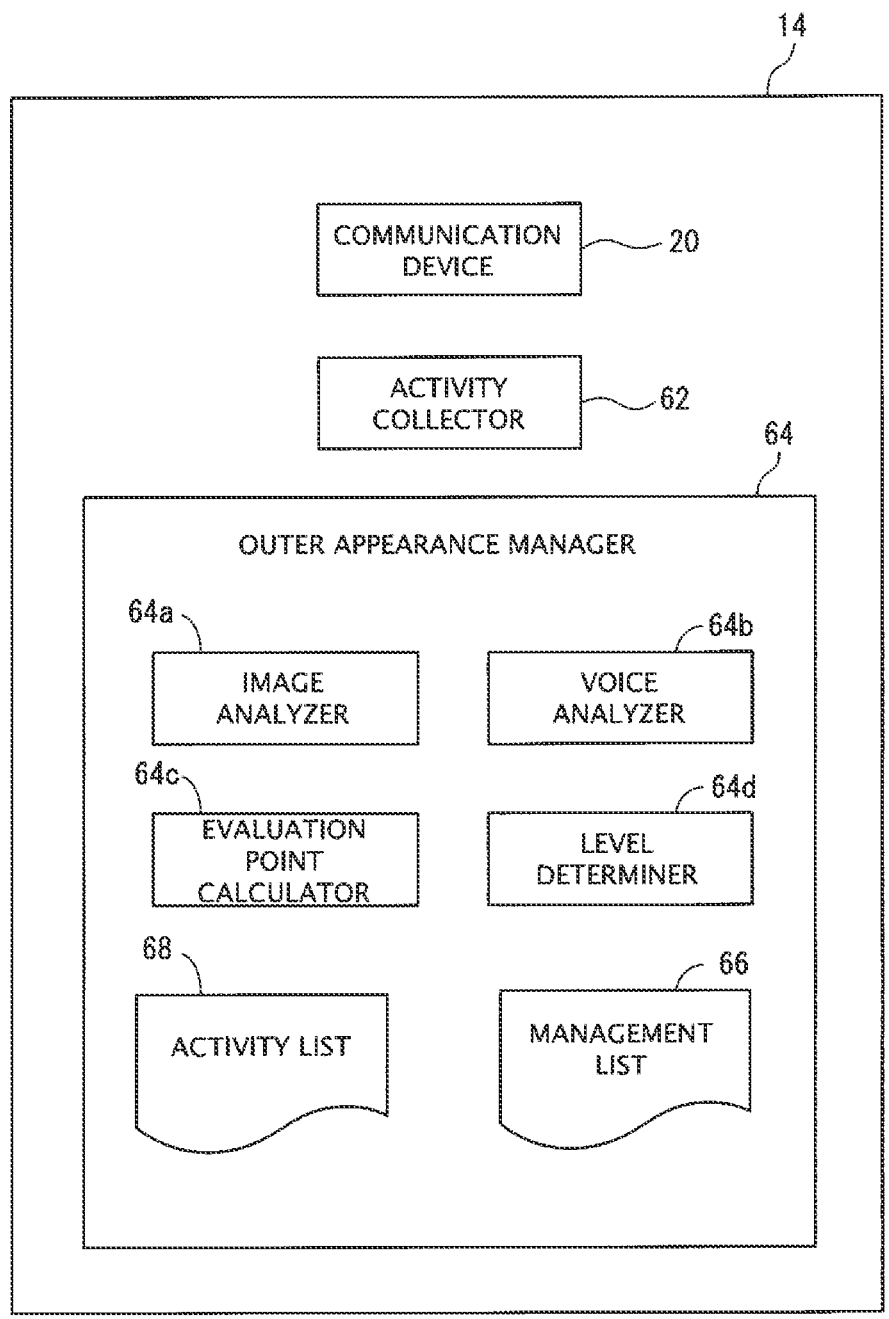
FIG. 4 is a block diagram illustrating functions of a managing apparatus.

FIG. 4 is a block diagram illustrating the functions of the managing apparatus 14. The managing apparatus 14 functionally includes the communication device 20, an activity collector 62, and an outer appearance manager 64, as illustrated in FIG. 4. As described above, the communication device 20 communicates with devices external to the managing apparatus 14. More specifically, the communication device 20 communicates with the mobile body 12, the mobile terminal 104 of the guest 100, the security cameras, the managing server of attractions, terminals of park staff, for example.

The activity collector 62 collects, through the communication device 20, the activity information indicating activities of the guest 100 and temporarily stores the collected activity information. The activity information may include, for example, image data of captured images of the guest 100, sound data of recorded speech of the guest 100, settlement history data of the guest 100, and support data acquired from the mobile body 12.

The outer appearance manager 64 analyzes the activities of the guest 100 based on the activity information temporarily stored in the activity collector 62, and manages the outer appearance of the mobile body 12 in accordance with the analysis results. Prior to description of the configuration of the outer appearance manager 64, a management list 66 stored in the outer appearance manager 64 for management will first be described with reference to FIG. 5.

Figure 5:
FIG. 5 illustrates an example management list.

FIG. 5 illustrates an example of the management list 66. The outer appearance manager 64 manages and stores the management list 66 to manage changes in the outer appearance of each mobile body 12. The management list 66 stores various information that is necessary for managing the outer appearance level La separately for each guest group 102. In the example illustrated in FIG. 5, the management list 66 records guest IDs, support evaluation point Ss, morality evaluation points Sm, consumption evaluation points Sc, the outer appearance level La, and mobile body IDs. The management list 66 may further record, in addition to the above items, identification information regarding the mobile terminals 104 of the guests 100, credit card information used for settlement, contact information of the guests 100, attribute information such as sex and address of the guests 100, for example, although not shown in FIG. 5.

The guest ID refers to identification information of a representative guest 100 among one or more guests 100 forming each guest group 102. The mobile body ID refers to identification information of the mobile body 12 that is lent to each guest group 102. When the guest group 102 has not arrived at the park and the mobile body 12 has not been lent to the guest group 102, "Null" is recorded in the mobile body ID section.

The support evaluation point Ss refers to an evaluation point indicative of the amount of supporting action performed by the guest 100 for the mobile body 12. The supporting action may be any actions and may include, for example, cleaning of the mobile body 12, replacement of the battery 32, and restoring the mobile body 12 that is unavailable due to rolling over or loss of a wheel. The guest 100, receiving a support request from the mobile body 12, performs these supporting actions.

The morality evaluation point Sm refers to an evaluation point obtained by evaluating the activities of the guest 100 in terms of morality. Therefore, the more morally desirable activities the guest 100 performs, the higher the morality evaluation point Sm, and the more morally undesirable activities the guest 100 performs, the lower the morality evaluation point Sm. The morally desirable activities include, for example, picking up trash on the road, giving up a seat to an elderly person, and expressing moderate affection (e.g., patting the head 70) toward the mobile body 12. The morally undesirable activities include littering, interrupting queues, and violence and verbal abuse against the mobile body 12 and others, for example. The consumption evaluation point Sc refers to an evaluation point for evaluating the consumption activities of the guest 100 within the park, and is higher as the consumption activity is performed more actively.

The outer appearance manager 64 analyzes the activity information temporarily stored in the activity collector 62 to calculate the support evaluation point Ss, the morality evaluation point Sm, and the consumption evaluation point Sc of each guest group 102 as appropriate, and then records these evaluation points in the management list 66. The outer appearance manager 64 further determines, based on the calculated evaluation points Ss, Sm, and Sc, the outer appearance level La to be applied to the guest group 102. The outer appearance level La may be determined by any method and may be determined based on the sum Ssum of the support evaluation point Ss, the morality evaluation point Sm, and the consumption evaluation point Sc, for example. Alternatively, the outer appearance manager 64 may calculate a level Ls from the support evaluation point Ss, a level Lm from the morality evaluation point Sm, and a level Lc from the consumption evaluation point Sc, and use the lowest level among the three calculated levels Ls, Lm, and Lc as the outer appearance level La to be applied to the guest group 102. In any case, the outer appearance manager 64 records the determined outer appearance level La in the management list 66. The outer appearance manager 64 further notifies the mobile body 12 of a change instruction including the recorded outer appearance level La. Receiving the change instruction, the mobile body 12 takes the outer appearance in accordance with the outer appearance level La included in the change instruction. Here, values of the support evaluation point Ss, the morality evaluation point Sm, the consumption evaluation point Sc, and the outer appearance level La recorded in the management list 66 may be reset to initial values upon exit of the guest group 102 from the park, or may be maintained after the guest group 102 leaves the park. In the former case, the guest 100 can enjoy rearing the mobile body 12 every time they visit the park. In the latter case, in which past visits to the park are reflected on the outer appearance of the mobile body 12, the guest 100 is motivated to visit the park repeatedly.

Referring back to FIG. 4, the specific configuration of the outer appearance manager 64 will be described. The outer appearance manager 64 functionally includes, an image analyzer 64a, a voice analyzer 64b, an evaluation point calculator 64c, and a level determiner 64d, as illustrated in FIG. 4.

The image analyzer 64a analyzes the imaging data temporarily stored in the activity collector 62 to recognize the actions of the guest 100. The image analyzer 64a, for example, prestores a plurality of target actions, and extracts actions matching the target actions from the imaging data to thereby recognize the actions of the guest 100. The prestored target actions are related to calculation of the evaluation points and may include actions such as picking up or littering trash. The image analyzer 64a outputs the extracted action type to the evaluation point calculator 64c.

The voice analyzer 64b analyzes the voice data temporarily stored in the activity collector 62 to recognize the content of speed of the guest 100. The voice analyzer 64b, for example, applies a known speech recognition technique to the voice data to convert the voice data to text data. The voice analyzer 64b further applies text mining processing to the obtained text data to thereby identify the speech content. The identified speech content is output to the evaluation point calculator 64c.

The evaluation point calculator 64c calculates the support evaluation point Ss, the morality evaluation point Sm, and the consumption evaluation point Sc for each guest group 10, and records the calculated values in the management list 66. For this calculation, the outer appearance manager 64 stores an activity list 68 in which values of the evaluation points corresponding to various activities are recorded. For example, the evaluation point calculator 64c sets a value of "Sm=1" for the activity of "picking up trash", a value of "Sm=−1" for the activity of "littering trash", a value of "Sm=1" for the activity of "speech favorable to others", and a value of "Ss=1" for the activity of "battery replacement", respectively.

The evaluation point calculator 64c checks the type of action extracted from the imaging data in the image analyzer 64a against the activity list 68 to specify an adding value for the evaluation point corresponding to the extracted action, and reflects the point on the current evaluation point. For example, in response to the action of "littering" extracted for a certain guest 100 by the image analyzer 64a, the evaluation point calculator 64c calculates a new morality evaluation point Sm of the guest 100 by subtracting 1 from the current morality evaluation point Sm of the guest 100. Similarly, the evaluation point calculator 64c checks the speech content transmitted from the voice analyzer 64b against a speech list to specify an adding value for the evaluation point corresponding to the speech content of the guest 100 and reflects the point on the current evaluation point.

The evaluation point calculator 64c further calculates the support evaluation point Ss based on the support data temporarily stored in the activity collector 62. The support data includes reactions of the guest 100 to a support request from the mobile body 12 as described above and indicates the content of supporting actions performed by the guest 100. The evaluation point calculator 64c checks the content of the supporting actions recorded in the support data against the activity list 68 to specify an adding value of the evaluation point, and reflects the point on the current evaluation point.

The evaluation point calculator 64c further calculates the consumption evaluation point Sc based on the settlement data temporarily stored in the activity collector 62. The consumption evaluation point Sc may be in proportion to the amount of spent money, for example. Alternatively, the consumption evaluation point Sc may be calculated in consideration of at least one of the consumption frequency, the consumption items, or the settlement method, in addition to the amount of spent money. For example, the consumption evaluation point Sc may be higher for a higher consumption frequency when the same amount of money is spent. The consumption evaluation point Sc may also be different for different consumption items when the same amount of money is spent. For example, the consumption evaluation point Sc may be higher for buying souvenirs than eating at a restaurant using the same amount of money. In addition, the consumption evaluation point Sc may be higher for the electronic settlement than for the cash settlement when the same amount of money is used.

The level determiner 64d periodically checks the evaluation points recorded in the management list 66, and determines the outer appearance level La to be applied to the guest 100 based on the evaluation points. As described above, the method of determination is not limited to this example. For example, the outer appearance level La may be determined based on the sum Ssum of the support evaluation point Ss, the morality evaluation point Sm, and the consumption evaluation point Sc, or the minimum level among the levels determined for each evaluation point may be determined as the outer appearance level La.

The level determiner 64d, in response to the determined outer appearance level La that is different from the outer appearance level La recorded in the management list 66, records the determined outer appearance level La in the management list 66, and also outputs a change instruction to the mobile body 12 to instruct the mobile body 12 to change the outer appearance to the outer appearance at the determined outer appearance level La. Receiving the change instruction, the mobile body 12 changes its outer appearance to the outer appearance at the outer appearance level La instructed by the change instruction. The mobile body 12 may further increase or decrease the number of functions to be provided for the guest 100 in accordance with the outer appearance level La. The mobile body 12 may further change its behavior by increasing or decreasing the number of affection-expressing actions performed with respect to the guest 100 in accordance with the outer appearance level La.

Figure 6:
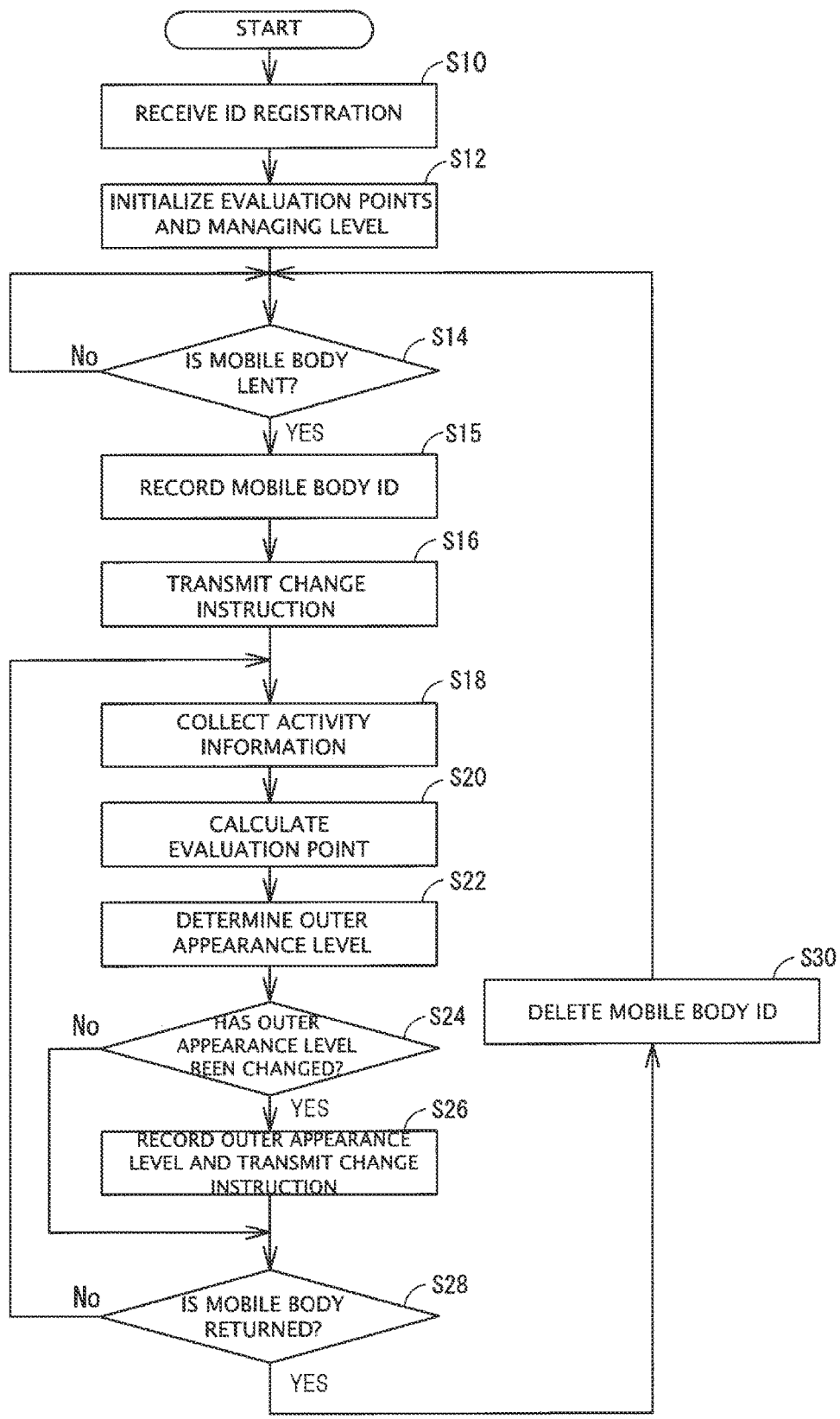
FIG. 6 is a flowchart showing a flow of processes performed by the managing apparatus to manage changes in the outer appearance.

Referring now to FIG. 6, a flow of management of the changes in the outer appearance of the mobile body 12 in the mobile body system 10 will be described. FIG. 6 is a flowchart showing a flow of processing performed by the managing apparatus 14 to manage the changes in the outer appearance.

The managing apparatus 14 receives ID registration of each guest group 102 to manage changes in the outer appearance of the mobile body 12 (S10). For the ID registration, the managing apparatus 14 acquires, from a representative guest 100 within a guest group 102, identification information of the mobile terminal 104, credit card information used for settlement, contact information, and attribute information such as sex and address, for example, and records the acquired information in the management list 66. Upon completion of the ID registration, the managing apparatus 14 initializes the evaluation points and the outer appearance level La corresponding to the guest group 102 (S12). Specifically, the managing apparatus 14 records Ss=0, Sm=0, Sc=0, and La=1 in the management list 66 as the evaluation points of the guest group 102.

The managing apparatus 14 then waits until the mobile body 12 is lent to the guest group 102. If the mobile body 12 is lent to the guest group 102 (Yes in S14s), the managing apparatus 14 records ID of the mobile body 12 that is lent in the management list 66 (S15). The managing apparatus 14 further checks the outer appearance level La recorded in the management list 66, and transmits a change instruction to the mobile body 12 that is lent to instruct the mobile body 12 to change its outer appearance level to the recorded outer appearance level La (S16).

The managing apparatus 14 subsequently collects the activity information of the guest 100 (S18). Specifically, the managing apparatus 14 collects the imaging data, the voice data, the support data, and the settlement data as the activity information. The managing apparatus 14 calculates the evaluation points of the guest 100 based on the collected activity information, and records the values in the management list 66 (S20). The managing apparatus 14 further determines the outer appearance level La to be applied to the guest group 102 based on the evaluation points recorded in the management list 66 (S22). After determining the outer appearance level La, the managing apparatus 14 compares the calculated outer appearance level La with the current outer appearance level La recorded in the management list 66 (S24). In response to a comparison result showing that the calculated outer appearance level La is equal to the current outer appearance level (No in S24), the process of the managing apparatus 14 proceeds to step S28.

In response to a comparison result showing that the calculated outer appearance level La is different from the current outer appearance level (Yes in S24), the managing apparatus 14 records the calculated outer appearance level La in the management list 66 and also transmits a change instruction to the mobile body 12 to instruct a change in the outer appearance (S26). Receiving this instruction, the mobile body 12 changes its outer appearance to the outer appearance in accordance with the instructed outer appearance level La. The mobile body 12 may further increase or decrease the number of functions to be provided for the guest 100 or the number of affection-expressing actions performed with respect to the guest 100, in accordance with this change in the outer appearance.

In step S28, the managing apparatus 14 confirms whether or not the mobile body 12 has been returned to the park. If the mobile body 12 has not been returned and remains lent to the guest 100 (No in S28), the process of the managing apparatus 14 returns to step S18, and the managing apparatus 14 repeats collection of the activity information and calculation of the outer appearance level La. If the guest 100 has left the park and the mobile body 12 has been returned to the park (Yes in S28), the managing apparatus 14 deletes the identification information of the mobile body 12 corresponding to the guest 100 from the management list 66 (S30) and the process returns to step S14.

While, in the example of FIG. 6, the evaluation points and the outer appearance level La are maintained after return of the mobile body 12, these values may be reset upon return of the mobile body 12. In this case, after the managing apparatus 14 deletes the ID of the mobile body 12 in step S30, the process returns to step S12.

As is clear from the above description, in this example, the outer appearance of the mobile body 12 changes in accordance with the activities of the guest 100. This configuration enables the guest 100 to increase their attachment to the mobile body 12 and thereby further enjoy their stay in the park. Further, the mobile body 12 is changed to have an outer appearance having a greater amount of growth and higher rarity as the guest 100 performs more activities that are desirable to the park manager. This configuration can motivate the guest 100 to positively perform activities that are desirable to the park manager. In other words, this example configuration enables direction of the guest 100 toward activities that are desirable to the park manager.

In this example, the activities of the guest 100 are evaluated in terms of morality, for example. This configuration encourages the guest 100 to positively perform morally desirable activities. Here, morally undesirable activities include activities that typically make others feel uncomfortable or inconvenience others. Preventing these morally undesirable activities allows the guest 100 to spend a comfortable time in the park.

In this example, the supporting actions performed by the guest 100 for the mobile body 12 are also evaluated. This configuration encourages the guest 100 to positively perform the supporting actions for the mobile body 12, thereby enabling smoother management of the mobile body 12. In this example, the consumption activities of the guest 100 are also evaluated. This configuration encourages the guest 100 to positively perform consumption, thereby increasing profitability of the park.

Figure 7:
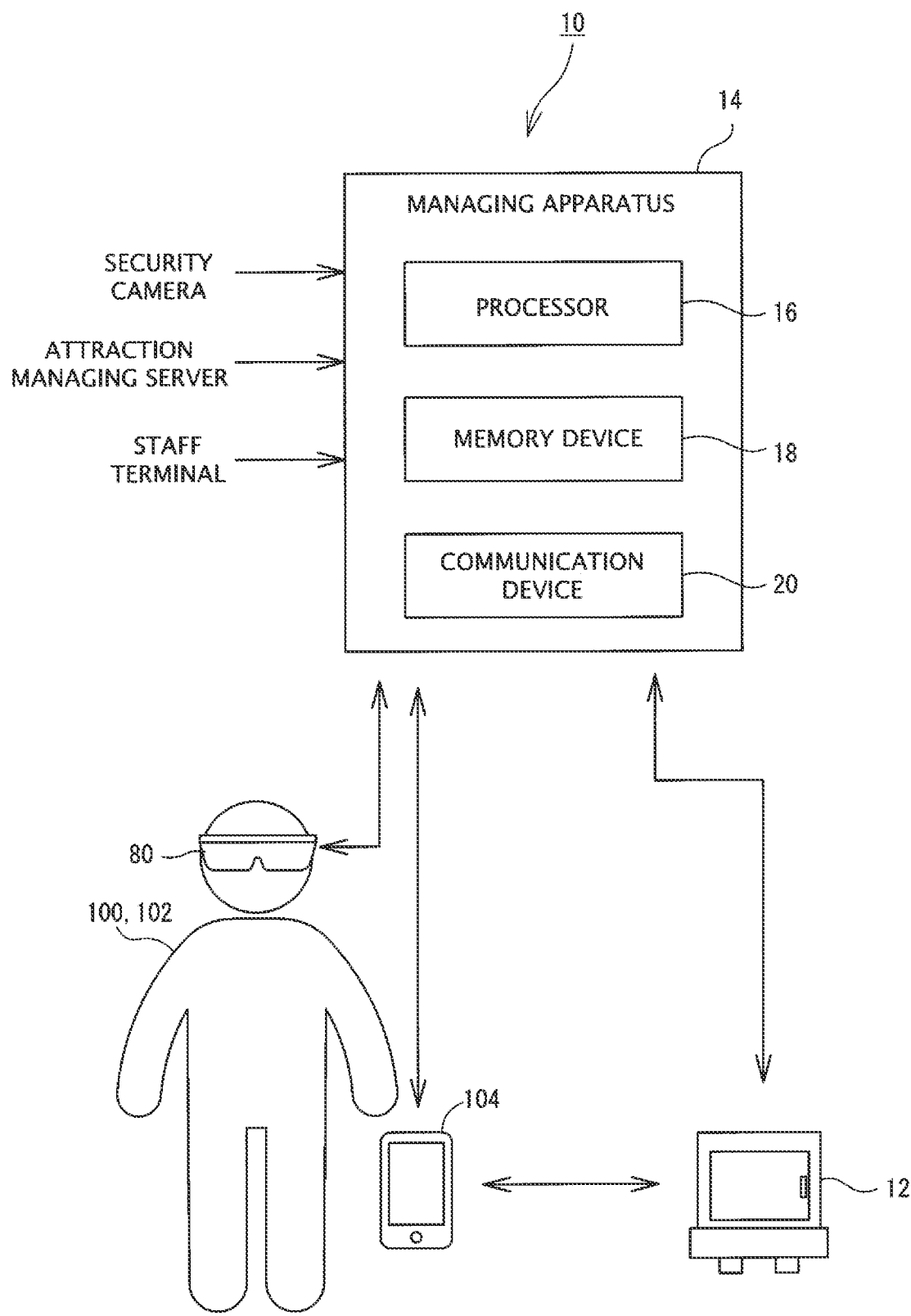
FIG. 7 illustrates another example mobile body system.

A further example of the mobile body system 10 will be described. FIG. 7 illustrates a further example mobile body system 10. The mobile body system 10 in this example is substantially the same as the mobile body system 10 described above by reference to FIG. 1 to FIG. 6 except for the principle of changing the outer appearance of the mobile body 12. Therefore, in the following, only the principle of changes to the outer appearance of the mobile body 12 in this mobile body system 10 will be described.

In the mobile body system 10 illustrated in FIG. 7, an augmented reality technique is used to change the outer appearance of the mobile body 12 viewed by the guest 100 without changing the mechanical configuration of the mobile body 12. Specifically, in the example illustrated in FIG. 7, the mobile body system 10 further includes, in addition to the mobile body 12 and the managing apparatus 14, AR glasses 80.

Figure 8:
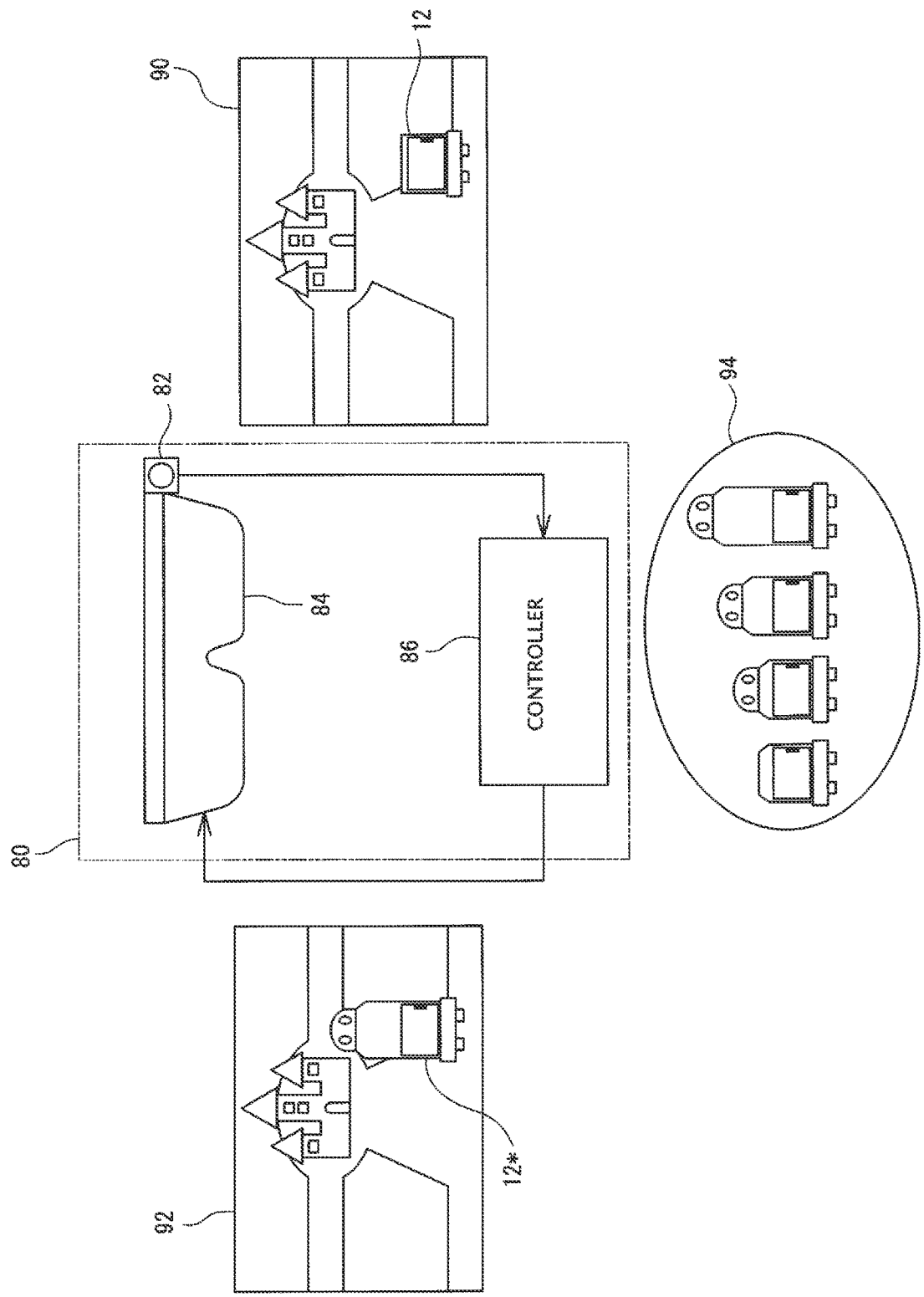
FIG. 8 is an image view illustrating changes in the outer appearance of a mobile body with AR glasses.

The AR glasses 80 are a display device of an eyeglasses shape that forms a real image by imaging an actual space and superposing a virtual object image on the real image to generate a superposed image, which is then provided as a user field image. The object image superposed on the real image makes the user feel an optical illusion that an object represented by the object image actually exists. FIG. 8 is an image view illustrating how the AR glasses 80 change the outer appearance of the mobile body 12.

As illustrated in FIG. 8, the AR glasses 80 include a camera 82 that captures a real image 90, an eyeglasses display 84 that displays a superposed image 92, and a controller 86 that controls driving of the camera 82 and the eyeglasses display 84 and also generates the superposed image 92. The AR glasses 80 further store, as an object image, three-dimensional image data 94 of the mobile body 12 corresponding to the outer appearance levels La.

The AR glasses 80 are lent to the guest 100 along with the mobile body 12. The managing apparatus 14 determines the outer appearance level La of the mobile body 12 based on the activities of the guest 100. The outer appearance level La is determined in the same manner as in the mobile body system 10 illustrated in FIG. 1. The managing apparatus 14 notifies the AR glasses 80 and the mobile body 12 of the determined outer appearance level La. The AR glasses 80 select an object image 12* or three-dimensional image data 94 of the mobile body 12 corresponding to the notified outer appearance level La, and superpose the selected object image 12* on the image of the mobile body 12 in the real image 90 to thereby generate the superposed image 92. The AR glasses 80 then display the generated superposed image 92 on the eyeglasses display 84. This enables the guest 100 wearing the AR glasses 80 to recognize the outer appearance of the mobile body 12 as the outer appearance shown in the object image 12*. In other words, use of the AR glasses 80 enables a change in the outer appearance of the mobile body 12 viewed from the guest 100 without changing the mechanical configuration of the mobile body 12. As this configuration eliminates the need for changing the mechanical configuration of the mobile body 12, the degree of freedom of changing the outer appearance of the mobile body 12 is further increased.

As is clear from the above description, the mobile body system 10 illustrated in FIGS. 7 and 8, similar to the mobile body system 10 illustrated in FIGS. 1 to 6, changes the outer appearance of the mobile body 12 viewed from the guest 100 in accordance with the activities of the guest 100. This system therefore also increases the attachment of the guest 100 to the mobile body 12, to thereby allow the guest 100 to further enjoy staying in the park. This configuration can further guide the activities of the guest 100 as the park manager desires.

The configurations described above are only examples, and any modified features may be employed in a configuration that changes the outer appearance of the mobile body 12 viewed by the guest 100 in accordance with the activities of the guest 100. For example, the reference used for changing the outer appearance may be changed as appropriate. While, in the above description, the outer appearance level La is determined based on all of the three activity types, the support activities, the moral activities, and the consumption activities, it is not necessary to consider all of the three types of activities. Specifically, the outer appearance level La may be determined based only on the amount of support activities or the amount of moral activities. Further, the outer appearance may be determined in accordance with the activities of the guest 100 including other references. For example, the outer appearance level La may be determined based on the number of visits of the guest 100 to the park, or whether or not the guest 100 has completed a specific mission within the park, for example.

In addition to the activities of the guest 100 within the park, their activities outside the park may also be considered to determine the outer appearance of the mobile body 12. For example, the outer appearance of the mobile body 12 may be determined in consideration of a purchase history of mail-order shopping of the park goods, posting of contents regarding the park to SNS, and other activities, in addition to the activities of the guest 100 within the park. Alternatively, the outer appearance of the mobile body 12 may be determined in consideration of the score of a computer game that rears the mobile body 12, which is previously distributed. Further, the shape or change mode of the mobile body 12 may be modified as appropriate. For example, the mobile body 12 may have a shape of an electric cart, an electric kicking skater, an electric kick scooter, and a flying object, for example.

REFERENCE SIGNS LIST

10 mobile body system, 12 mobile body, 14 managing apparatus, 16 processor, 18 memory device, 20, 44 communication device, 62 activity collector, 64 outer appearance manager, 64a image analyzer, 64b voice analyzer, 64c evaluation point calculator, 64d level determiner, 66 management list, 68 activity list, 70 head, 72 torso, 80 AR glasses, 84 eyeglasses display, 90 real image, 92 superposed image, 94 three-dimensional image data, 100 guest, 102 guest group, 104 mobile terminal.

The invention claimed is:

1. A mobile body system for managing a mobile body that moves within a predetermined area, the mobile body system comprising:
   a mobile body associated with a guest group comprising one or more guests;
   a managing apparatus configured to manage an outer appearance of the mobile body; an augmented reality display configured to display a virtual object image superposed on a real image of the mobile body, wherein the managing apparatus comprises:
      an activity collector configured to collect activity information indicative of an activity of the guest within the predetermined area, and
      an outer appearance manager configured to change the outer appearance of the mobile body viewed by the guest based on the activity information collected by the activity collector, the augmented reality display stores, as the object image, a plurality of images showing the outer appearance of the mobile body, and
   the outer appearance manager changes the object image to be superposed on the real image of the mobile body based on the activity information collected by the activity collector to thereby change the outer appearance of the mobile body viewed by the guest.

2. The mobile body system according to claim 1, wherein the outer appearance manager evaluates the guest based on an amount of support activity performed by the guest for the mobile body, and changes the outer appearance of the mobile body to an outer appearance having a greater amount of growth or an outer appearance with higher rarity as the guest is evaluated more highly.

3. The mobile body system according to claim 1, wherein the outer appearance manager evaluates the activity of the guest in terms of morality based on the activity information, and changes the outer appearance of the mobile body to an outer appearance having a greater amount of growth or an outer appearance with higher rarity as the guest is evaluated more highly.

4. The mobile body system according to claim 1, wherein the outer appearance manager evaluates the activity of the guest according to an amount of consumption activity based on the activity information, and changes the outer appearance of the mobile body to an outer appearance having a greater amount of growth or an outer appearance with higher rarity as the guest is evaluated more highly.

5. The mobile body system according to claim 1, wherein the outer appearance of the mobile body is changeable by expanding or contracting, swelling or shrinking, or storing or developing at least some components of the mobile body.

6. The mobile body system according to claim 1, wherein the activity collector collects, as the activity information, at least one of image data obtained by imaging the guest, recorded data obtained by recording speech of the guest, settlement data indicating a settlement history of the guest, or support data indicating a reaction of the guest to a support request from the mobile body.

7. The mobile body system according to claim 1 wherein the mobile body increases or decreases the number of functions to be provided for the guest in accordance with a change in the outer appearance.

* * * * *